United States Patent
Lechner et al.

(10) Patent No.: US 12,504,439 B2
(45) Date of Patent: Dec. 23, 2025

(54) COIL BODY, INDUCTIVE ROTATIONAL SPEED SENSOR, AND METHOD FOR PRODUCING THE SAME

(71) Applicant: Knorr-Bremse Systeme Fuer Nutzfahrzeuge GmbH, Munich (DE)

(72) Inventors: Klaus Lechner, Pretzfeld (DE); Andre Kluftinger, Kleinheubach (DE); Christoph Huber, Munich (DE); Stefan Palzer, Ortenburg (DE); Martin Buettner, Mühldorf a. Inn (DE); Ines Fruhstorfer, Zwiesel (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 410 days.

(21) Appl. No.: 17/312,356

(22) PCT Filed: Dec. 3, 2019

(86) PCT No.: PCT/EP2019/083519
§ 371 (c)(1),
(2) Date: Jun. 9, 2021

(87) PCT Pub. No.: WO2020/126482
PCT Pub. Date: Jun. 25, 2020

(65) Prior Publication Data
US 2022/0018870 A1 Jan. 20, 2022

(30) Foreign Application Priority Data
Dec. 18, 2018 (DE) .................... 10 2018 132 694.7

(51) Int. Cl.
*G01P 1/02* (2006.01)
*G01D 11/24* (2006.01)
*G01P 3/488* (2006.01)
*H01F 27/29* (2006.01)

(52) U.S. Cl.
CPC ............ *G01P 1/026* (2013.01); *G01D 11/245* (2013.01); *G01P 3/488* (2013.01); *H01F 27/29* (2013.01)

(58) Field of Classification Search
CPC ....... G01P 1/026; G01P 3/488; G01D 11/245; G01D 5/20; G01D 5/2006; G01D 5/2013;
(Continued)

(56) References Cited

U.S. PATENT DOCUMENTS 5,121,056 A 6/1992 Onishi et al.
5,216,364 A * 6/1993 Ko ...................... F15B 15/2861
324/207.17
(Continued)

FOREIGN PATENT DOCUMENTS

DE 8532178 U1 1/1986
DE 4106104 A * 9/1992 .............. G01P 1/026
(Continued)

OTHER PUBLICATIONS

International Search Report for PCT/EP2019/083519 Issued Jun. 24, 2020.

*Primary Examiner* — David M Schindler
(74) *Attorney, Agent, or Firm* — NORTON ROSE FULBRIGHT US LLP

(57) ABSTRACT

A coil body for an inductive rotational speed sensor, including: a base body having at least one winding region for coil windings about an axial axis and an opening for receiving a pole assembly along the axial axis; and two current rails, each of which run parallel to the axial axis and include a contact region for electrical connection cables to connect the coil in the winding region to the electrical connection cables, in which each of the contact regions includes at least one bendable section to guide the electrical connection cables at least in some sections parallel to the axial axis or, perpendicular thereto, in a radial manner. Also described are a
(Continued)

related inductive rotational speed sensor, and related methods.

17 Claims, 4 Drawing Sheets

(58) Field of Classification Search
CPC ...... G01D 5/202; G01D 5/2026; G01D 5/145; H01F 27/29; H01F 27/325; G01R 33/028; G01R 33/0283; G01B 7/30
See application file for complete search history.

(56) References Cited

U.S. PATENT DOCUMENTS

| | | |
|---|---|---|
| 5,539,307 A | 7/1996 | Bischof et al. |
| 6,563,304 B1 | 5/2003 | Palfenier et al. |

FOREIGN PATENT DOCUMENTS

| | | | |
|---|---|---|---|
| DE | 4231115 | A1 | 3/1994 |
| DE | 19507028 | A1 | 9/1996 |
| DE | 19616069 | C1 | 6/1997 |
| DE | 19612765 | A1 | 11/1997 |
| DE | 102006021018 | A1 | 11/2007 |
| JP | 4-181164 | A * | 6/1992 |
| JP | H075184 | A | 1/1995 |
| JP | 7-55824 | A * | 3/1995 |
| JP | H8327642 | A | 12/1996 |
| JP | H102757 | A | 1/1998 |
| JP | H10239339 | A | 9/1998 |
| JP | 2000077109 | A | 3/2000 |
| JP | 2007170965 | A | 7/2007 |
| JP | 2016178062 | A | 10/2016 |
| WO | 9736729 | A1 | 10/1997 |

* cited by examiner

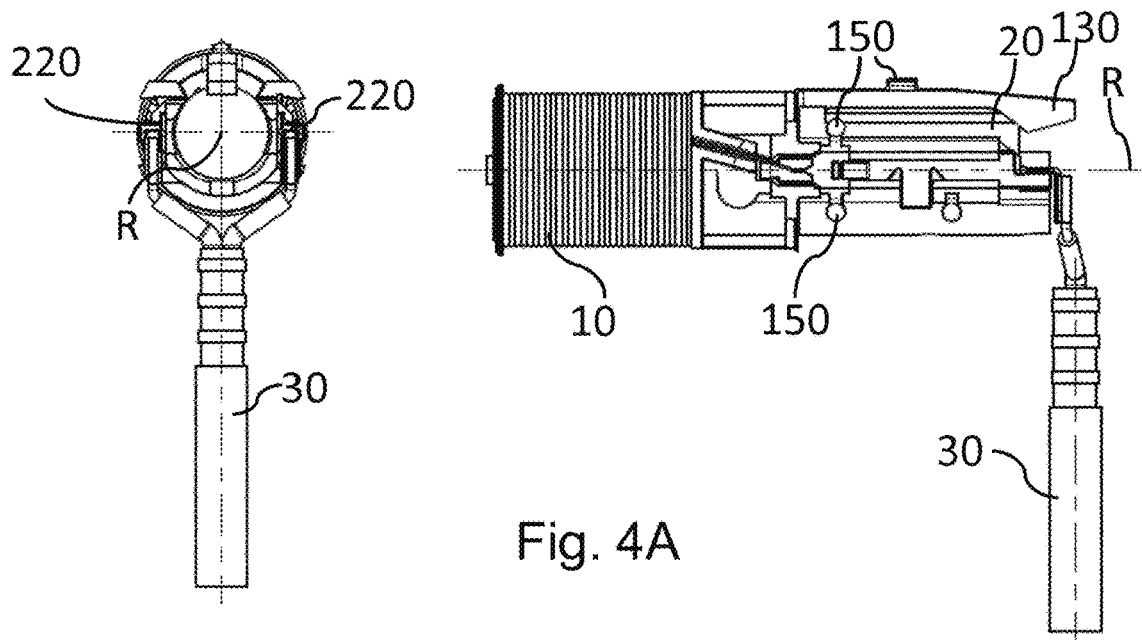
Fig. 4A
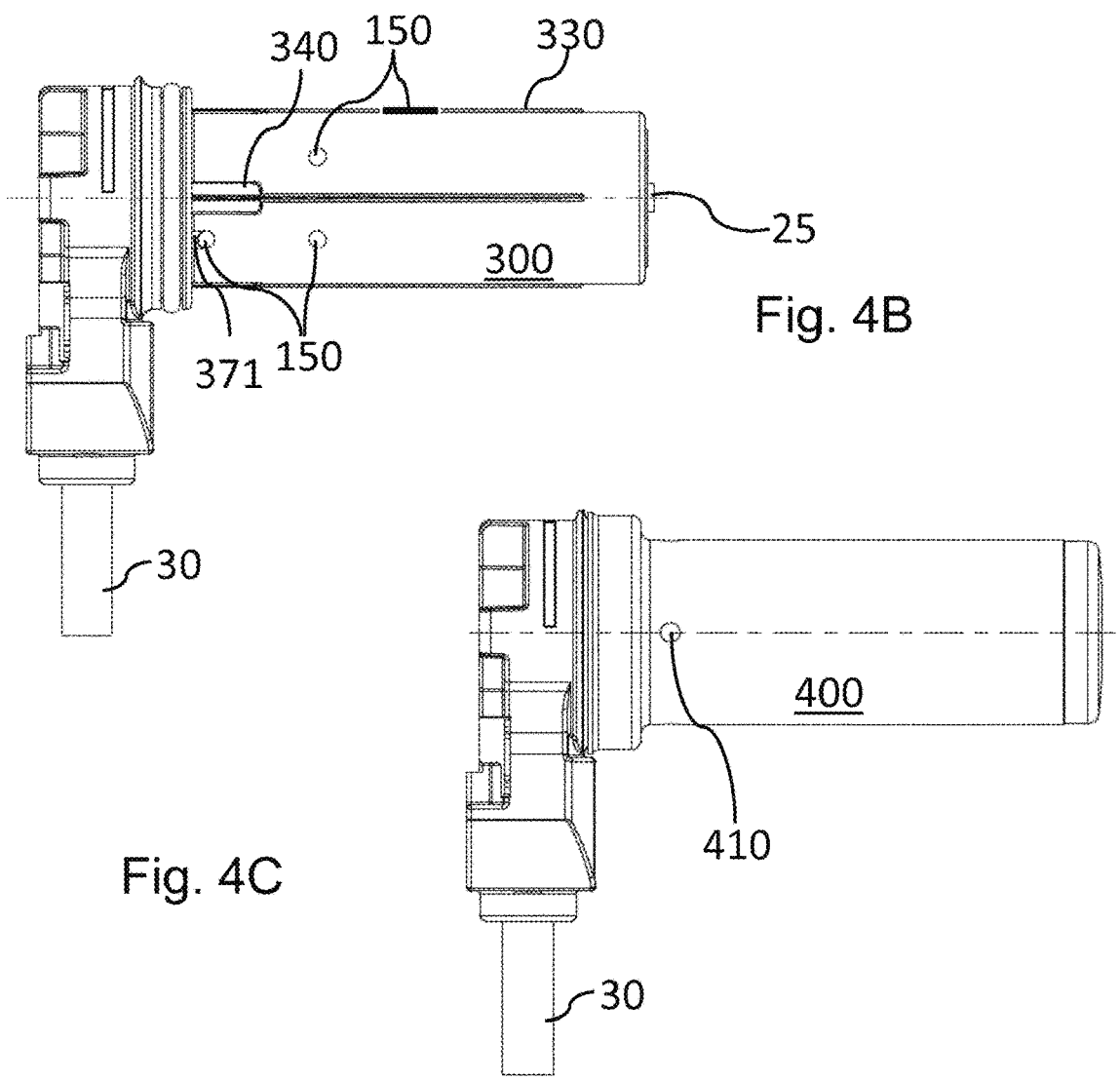
Fig. 4B
Fig. 4C

COIL BODY, INDUCTIVE ROTATIONAL SPEED SENSOR, AND METHOD FOR PRODUCING THE SAME

FIELD OF THE INVENTION

The present invention relates to a coil body, an inductive rotational speed sensor and a method for producing same. The invention relates in particular to a coil body that can be used both for an axial inductive rotational speed sensor and also for a radial inductive rotational speed sensor.

BACKGROUND INFORMATION

Rotational speed sensors are used in the automotive industry in order to measure rotational speeds of rotatable components. To ensure that anti-locking systems for example function correctly, it is necessary to continuously determine a rotational speed of the relevant wheel. These rotational speed sensors use for example an inductive measuring procedure in order to determine a rotational speed of a pole wheel relative to a coil. Such sensors are extremely robust with respect to environmental influences, such as are typical in vehicle applications.

These inductive rotational speed sensors can be produced as radial or axial sensors. In the case of axial rotational speed sensors, the electrical connection cable with regard to the coil being used is guided in the axial direction away from the rotational speed sensor and can therefore be guided parallel to an axial axis around which the windings of the coil run. In the case of radial rotational speed sensors, the electrical connection cables run in the radial direction (perpendicular to the axial axis) out of the rotational speed sensor. One of the two variants is used depending upon the desired manner in which the cable is to be guided.

In the case of conventional rotational speed sensors, specific coil bodies and/or current rails which can be used either for the radial variant or for the axial variant are used for the radial and axial rotational speed sensors. This has an adverse effect on the flexibility and renders the production process complex.

There is therefore a requirement to simplify the production of coil bodies/current rails so that the coil body and/or the current rails can be used both for an axial inductive rotational speed sensor and also for a radial inductive rotational speed sensor.

SUMMARY OF THE INVENTION

At least one part of the above mentioned problems is solved by a coil body according to the description herein, an inductive rotational speed sensor according to the description herein and methods for producing same according to the further descriptions herein. The further descriptions define further advantageous embodiments of the subject matters of the main embodiments.

The present invention relates to a coil body for an inductive rotational speed sensor. The coil body comprises a base body that comprises a winding region for coil windings about an axial axis and an opening for receiving a pole assembly along the axial axis. Furthermore, the coil body comprises two current rails that each run parallel to the axial axis and comprise a contact region for electrical connection cables in order to connect the coil in the winding region to the electrical connection cables. Each contact region comprises at least one bendable section in order to guide as desired the electrical connection cables at least in some sections parallel to the axial axis or, perpendicular thereto, in a radial manner.

The coil body can consequently be used both for a radial rotational speed sensor and also for an axial rotational speed sensor. The two current rails can be advantageously embodied in an identical manner, can be fastened to opposite lying sides on the base body and are bent in the bendable section for the radial variant differently than for the axial variant. The bendable section is embodied as such on the current rails and can comprise a thinned section, notches, perforations or other arrangements (structures) that facility a controlled bending thereof along a desired line.

Optionally, the coil body comprises at least one anti-rotational device that can be embodied as a radial protrusion on the base body in order by retaining said coil body in an exemplary encapsulation tool to prevent the coil body rotating during an encapsulation process (or during another encasing method). The winding section can be delimited in the axial direction on one side or on both sides by at least one disk-shaped section, wherein the at least one radial protrusion of the anti-rotation device can extend by at least 0.5 mm or at least 1 mm or more than 1.5 mm in the radial direction beyond the at least one disk-shaped section.

Optionally, the base body comprises at least one latching hook that is embodied so as to fix a pole assembly that is inserted in the opening of the base body in order thus to prevent an axial movement of the inserted pole assembly.

Optionally, the base body comprises at least one venting opening that is to connect an inner region of the base body, which is accessible through the opening, to an outer region in order to equalize the pressure between the inner region of the base body and the outer region as the pole assembly is inserted. A damping air pocket is consequently to be prevented during the insertion procedure.

Optionally, the two current rails each comprise a compressible slit in which a wire of the coil can be inserted. The slit can be embodied so as to reduce its slit width as it is compressed, wherein the inserted wire is prevented by the opposite lying stops from being cut through. This can be realized for example by way of a slit width and/or slit length and/or depth but also by way of rounded edges that make it difficult for the wire to be cut through. In particular, the two current rails can be de-burred in the region of the slit by a stamping procedure (on both sides) in order to prevent the coil wires being severed as the electrical contact to the coil is formed.

Optionally, the two current rails each comprise a tab that by way of a (positive-locking or non-positive locking) fixing arrangement on the base body prevent an axial displacement of the current rails relative to the base body. Furthermore, the two current rails can each comprise a barrier that is embodied so as during the exemplary encapsulation procedure to divert an encapsulating mass in the encapsulation tool in order thus to protect an electrical contact to the coil.

Optionally, the contact regions each comprise a surface area for providing a connection in the form of welding or soldering or crimping the electrical connection cable(s) or a further contacting arrangement in order to fasten the electrical connection cables to the respective contact regions.

The present invention relates also to an inductive rotational speed sensor having a previously defined coil body, a coil winding (coil) in the winding region of the base body and a pole assembly having a magnet and a pole core in the opening of the base body. Furthermore, the inductive rotational speed sensor comprises a casing made from a synthetic material, in particular from an encapsulating mass that encases the coil body having the coil winding and the pole assembly at least in part.

Optionally, the anti-rotation device protrudes in part out of the casing (radially) or extends at least as far as an outer surface of the casing. The anti-rotation device appears after the casing as a raised structure on an outer surface of the casing.

Optionally, the casing comprises one or more ribs and a plateau on which the rib(s) end(s). Furthermore, the inductive sensor can comprise a protective sleeve (for example made from a magnetically non-conductive metal) that is embodied at least in part around the casing and can be joined to the casing by a caulking procedure using the plateau.

Optionally, the inductive rotational speed sensor comprises electrical connection cables that are connected to the contact regions and run at least in part parallel to the axial axis in order to form an axial rotational speed sensor or run perpendicular thereto in order to form a radial rotational speed sensor.

The present invention relates to a method for producing a current rail for a coil body as has been previously defined. The method comprises the steps:
  stamping a flat metal sheet in order to form an (electrical) contact region, a connection region for the coil windings and an intermediate region between the contact region and the connection region;
  forming a slit in a coil wire in the connection region;
  bending the connection region in order to form a U-shaped end section having the slit in a protruding limb;
  bending the contact region about a longitudinal direction of the flat metal sheet; and
  if the current rail is used for a radial inductive speed sensor, bending an end section of the contact region again about an axis that is perpendicular to the flat metal sheet.

Optionally, this method can comprise bending upwards a section of the flat metal sheet (for example punching out) in order to form a barrier and/or bending upwards a laterally protruding section in order to form a tab for providing the fastening.

The present invention relates to a method for producing a coil body for an inductive rotational speed sensor. This method comprises:
  providing a base body that comprises a winding region for coil windings about an axial axis and an opening for receiving a pole assembly along the axial axis; and
  attaching two current rails that each run parallel to the axial axis and comprise a contact region for electrical connection cables in order to connect the coil in the winding region to the electrical connection cables.

Optionally, the method comprises bending the contact regions in a bendable section, which is provided for this purpose, perpendicular to the axial axis in order to guide the electrical connection cables at least in some sections perpendicular to the axial axis.

The invention is not limited to a specific sequence of method steps. In the case of further exemplary embodiments, the method steps can be performed for both methods in a difference sequence.

Exemplary embodiments of the present invention overcome the previously mentioned problems by a universal coil body that can be used both for the axial and also for the radial variant of the inductive rotational speed sensor. Furthermore, two identical current rails can be used for this coil body, said identical current rails only being bent once more in the case of a radial rotational speed sensor in order thus to route the electrical connection cables in the radial direction. In contrast thereto, different coil bodies and/or different current rails are used for the axial and the radial variants in the case of conventional rotational speed sensors. The number of parts required is consequently reduced by virtue of using the universal coil body. Furthermore, a simple production and assembly procedure is rendered possible which in turn leads to considerable cost reductions.

In addition, exemplary embodiments provide the following advantages:
  An anti-rotation device prevents any undesired rotation during the exemplary encapsulation process. A separate retaining device is not necessary.
  A latching hook can reliably prevent the magnet or pole core moving during the manufacturing process. Consequently, the magnet/pole core can be easily removed in the event of the coil being wound incorrectly. The number of rejects as a result of faulty manufacture is minimized.
  The venting duct prevents air pockets forming between the magnet and the pole core as the magnet is inserted with the result that a rapid manufacturing process and in particular an automated manufacturing process is rendered possible.
  The current rails used provide the following advantages:
  The tab renders it possible to secure the current rail on the base body of the coil body in a simple and reliable axial manner.
  The barrier (spoiler) deflects the granulate or the encapsulating mass with the result that the weld site is reliably protected during the encapsulation process.
  As a result of the coil wires being clamped in, a safe and reliable retaining arrangement is provided for a welding or soldering process. The geometry of the gap prevents the coil wires being unintentionally severed. The crimped geometry used avoids to a great extent the loadings or changes in the cross-section of the coil wire as the wire is inserted and consequently provides a defined electrical connection of the coil.
  Sharp edges are removed by stamping or de-burring the edges of the current rails with the result that the wire is reliably protected in the winding region of the coil and in the welding region. In order to realize a high number of windings and consequently a high degree of inductivity, the wire is frequently very thin with the result that these protective mechanisms provide a particular advantage.

The exemplary embodiments of the present invention are better understood from the detailed description below and the attached drawings of the different exemplary embodiments, which are however not to be understood as limiting the disclosure to the specific embodiments but rather they serve solely for explaining and understanding the invention.

BRIEF DESCRIPTION OF THE DRAWINGS

FIG. 4A-4C illustrate in an exemplary manner the embodiment of the casing and attachment of the protective sleeve for the radial rotational speed sensor in accordance with further exemplary embodiments of the present invention.

DETAILED DESCRIPTION

Figure 1A:
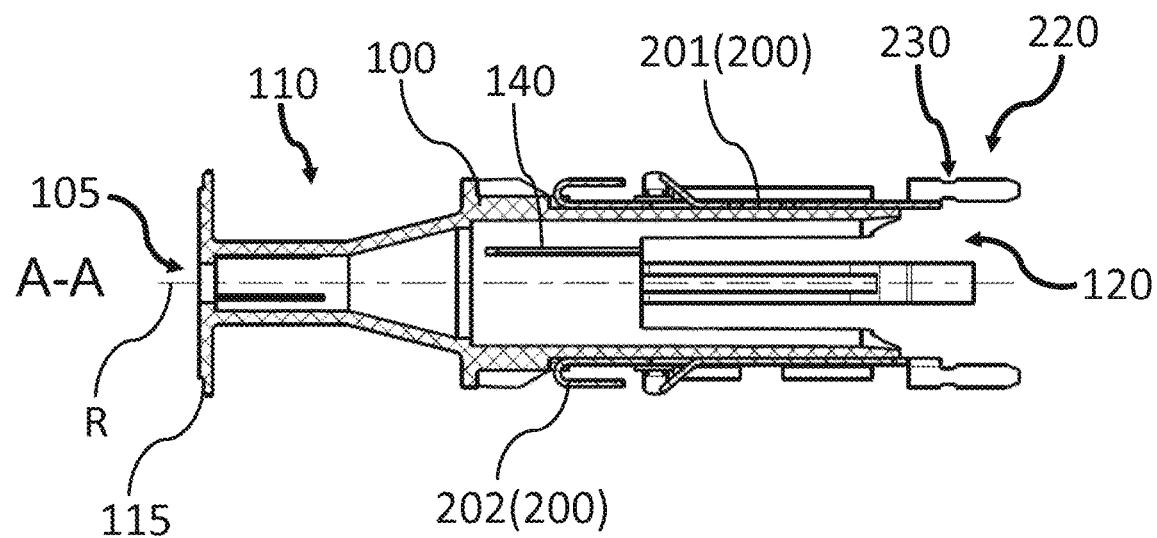
FIG. 1A, 1B illustrate a coil body in accordance with an exemplary embodiment of the present invention.
Figure 1B:
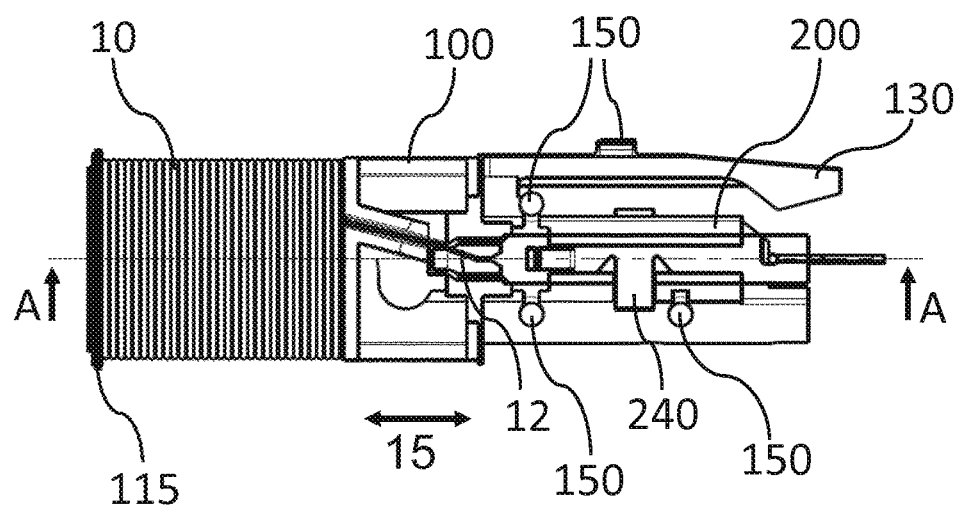

FIG. 1A illustrates a cross-sectional view of a coil body in accordance with an exemplary embodiment of the present invention that is suitable for an inductive rotational speed sensor. FIG. 1B illustrates a front view of the coil body, wherein the cross-sectional plane A-A is the horizontal plane and the coil body is illustrated with the coil windings 10 provided. The coil windings 10 form a coil of the inductive rotational speed sensor.

The coil body comprises a base body 100 that in turn comprises a winding region 110 for the coil windings 10 that are wound around an axial axis R (cf. FIG. 1B). Furthermore, the coil body comprises an opening 120 that is provided in order for a pole assembly to be inserted there along the axial axis R. The coil body further comprises two current rails 200, a first current rail 201 and lying opposite a second current rail 202 that each extend parallel to the axial axis R.

Furthermore, the winding region 110 is delimited axially by a disk-shaped end section 115 in order thus to form coil windings 10 in the winding region 110. The end section 115 comprises a hole (central opening) 105 in order to allow a pole core to protrude out of the coil body and thus to be able to effectively convey the magnetic field.

Furthermore, the exemplary embodiment comprises anti-rotation devices 150 (cf. FIG. 1B) that are embodied as protrusions on the base body 100. The protrusions 150 extend for example by at least 0.1 mm beyond the disk-shaped end sections 115 in the radial direction. It is consequently possible that the coil body is fixed for example in an encapsulating tool or another tool, which is used to form a casing, with the result that in particular rotational movements are not possible. It is possible for example to form at least three protrusions 150 along the circumferential direction of the base body 100 in order to serve simultaneously as spacers in the exemplary encapsulating tool. The anti-rotation devices 150 can comprise different shapes of protrusions. For example, the anti-rotation devices 150 can be embodied as pin-shaped elements (protruding out of the image plane of FIG. 1B) or as arrow-shaped elements (extending upwards in FIG. 1B), which can then later form a part of a rib of the casing that is yet to be formed.

Furthermore, the base body 100 comprises in the exemplary embodiment a latching hook 130 that is embodied in order to retain an inserted pole assembly in the opening 120 in the axial direction. Moreover, openings 140 are provided in the base body 100 that serve to render it possible to insert the pole assembly into the opening 120 by equalizing the pressure between an inner region of the base body 100 and an outer region with the result that the pole assembly can be inserted easily and quickly into the opening 120.

The two current rails 200 serve to provide the electrical contact to the coil 10 in the winding region 110 by using the electrical connection cables (not visible in FIGS. 1A, 1B). Each contact region 220 comprises a bendable section 230 that renders it possible to bend the contact region 220 at least in part perpendicular to the axial axis R (in FIG. 1A out of the image plane or into the image plane) in order thus to render possible as desired an axial or radial rotational speed sensor. If the contact regions 220 are not bent or are bent at the most in the direction towards the axial axis R, the illustrated coil body can be used for an axial rotational speed sensor. The wire ends 12 of the windings 10 are connected in the winding region 110 in a connection region 15 to respectively a current rail 200 lying opposite to the respective contact region 220.

Furthermore, in the exemplary embodiment, a tab 240 is embodied on the respective current rail 200. The tab 240 serves to fix the current rail 200 in an axial manner, wherein the tab 240 engages for example in a corresponding depression in the base body 100 in order thus to prevent the current rail 200 displacing.

Figure 2A:
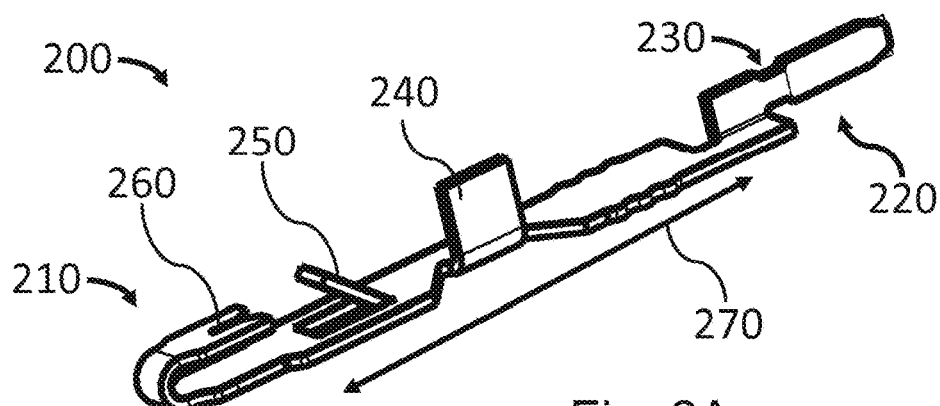
FIG. 2A-2D illustrate the configuration and production of the current rails that are used for the coil body.
Figure 2B:
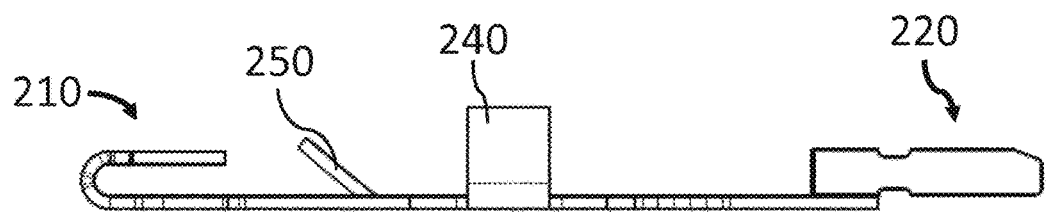
Figure 2C:
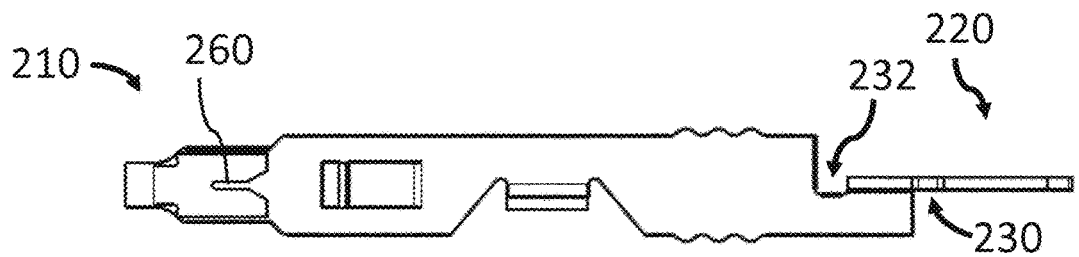
Figure 2D:
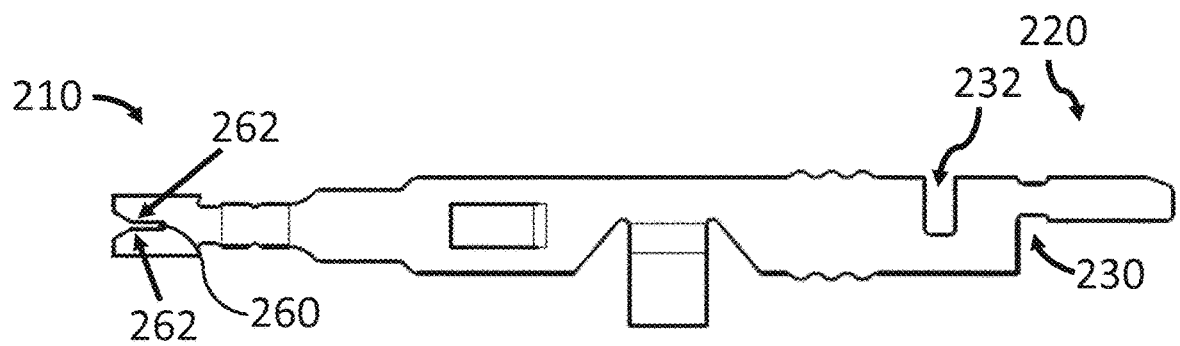

FIGS. 2A to 2D illustrate further details of the current rails 200. FIG. 2A illustrates the current rail 200 in a perspective view, FIG. 2B is a cross-sectional view, FIG. 2C is a plan view and FIG. 2D illustrates the current rail 200 as a flat metal sheet prior to the different sections being bent.

The current rails 200 can be embodied in particular in an identical manner and are only arranged on opposite sides of the base body 100. The current rails 200 comprise the connection region 210 for the coil wire 12 on the one side and for the contact region 220 on the opposite lying side, which are both connected to one another by an intermediate section 270. The current rail is bent perpendicular to a main surface in the contact region 220 in order to form a surface area for contacting the electrical connection cables.

The contact region 220 comprises at least one bending section 230 that is intended to facilitate the bending procedure with the result that by being optionally bent the current rail 200 can be used for axial and radial rotational speed sensors. The connection region 210 for the coil wire 12 is bent in a U-shaped manner and comprises a slit 260 in the protruding limb in order for at least one wire 12 of the coil 10 to be inserted therein. In practice, in the connection region 15 between the coil 10 and the connection site of the current rail 210 the coil wire 12 is twisted numerous times in order to ensure a stable connection to the current rail 200. This has a particularly advantageous effect during the procedure of encapsulating the sensor.

Furthermore, FIGS. 2A and 2B illustrate a section 250 that extends in the form of a barrier and is suitable for the purpose of protecting the connection region 210 during an encapsulation process. As is apparent in FIG. 1, this barrier 250 extends in a radial outwards manner with the result that as the coil body is inserted into an exemplary encapsulation tool the corresponding encapsulating mass is diverted around the barrier 250 and as a consequence a coil wire 12 in the slit 260 is not directly exposed to the encapsulating mass but rather only comes into contact with the encapsulating mass by the diversion. Furthermore, the tab 240 is manufactured as a vertically upwards bent section of the current rail 200. Likewise, the contact region 220 extends vertically upwards (away from the axial axis R; cf. FIG. 1A).

The current rail 200 can be produced for example in such a manner that a flat metal sheet is first stamped out, as is apparent in FIG. 2D. The slit 260 can be accordingly cut out or milled out. After this flat metal sheet has been prepared, the contact region 220 can be bent vertically upwards. Likewise, the tab 240 is bent vertically upwards in the intermediate section 270 and the connection region 210 is bent in a U-shaped manner. As a consequence, the current rail 200 is provided, as is apparent in FIG. 2B. The procedure of providing a bend in the contact region 220 is facilitated by virtue of the fact that on the one hand a notch 232 is provided in order to facilitate bending the current rail 200 along the axial axis R. Furthermore, the bendable section 230 is embodied in order to facilitate the procedure of providing a bend in the direction of the connection region 210. For example, the cross-sectional area of the current rail 200 in the bendable section 230 is reduced accordingly by way of lateral cut-outs in the material in order to realize a defined bend. The bendable section 230 can however also be embodied by a thinner material, by notches, by perforations or by other arrangements that facilitate a controlled procedure of bending along a desired line. This bend serves the purpose of adapting the current rail in a flexible manner to the application field (whether it is a radial or axial sensor).

Furthermore, the contact regions 220 form a surface area in order to weld, solder or otherwise fasten the electrical connection cables 30 thereto. It is likewise possible to crimp the connection cables 30 to the contact regions. The coil wires 12 can likewise be welded or soldered after they have been inserted in the slit 260.

Figure 3:
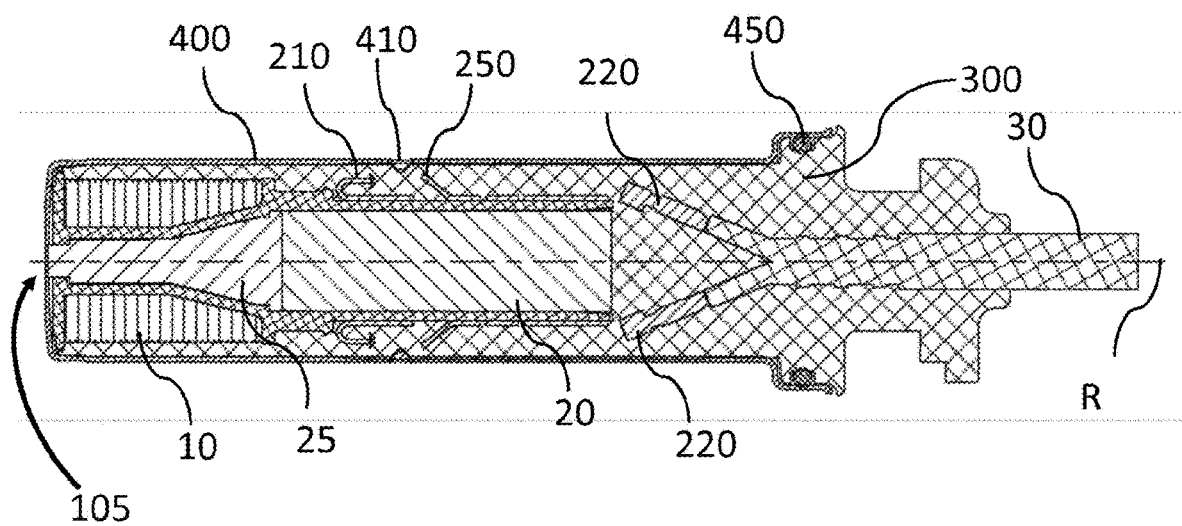
FIG. 3 illustrates an axial inductive rotational speed sensor in accordance with an exemplary embodiment of the present invention.

FIG. 3 illustrates an inductive rotational speed sensor in accordance with an exemplary embodiment of the present invention in which the coil body, as illustrated in FIG. 1A or 1B, is surrounded by a casing 300 and a sleeve 400. In the illustrated exemplary embodiment, the contact regions 220 are bent in such a manner that they face towards the axial axis R (Y-shaped contacting arrangement) in order to connect axially guided electrical connection cables 30 thereto. The notch 232 in the current rails 200 can be used for providing this bend (cf. FIGS. 2C and 2D). In addition to the Y-shape for the contacting arrangement, it is likewise possible to guide the connection cables 30 in a U-shaped manner towards the contact regions 220 with the result that the contact surfaces on the contact regions 220 lie parallel to one another. (cf. also FIG. 4A bottom).

Furthermore, FIG. 3 illustrates the pole assembly 20, 25 that comprises a magnet 20 and a pole core 25, wherein the pole core 25 is arranged as a separate section within the coil 10 and penetrates the hole 105 in the disk-shaped end section 115. Consequently, a direct as possible contact to the protection sleeve 400 is realized in order to effectively guide the magnetic field lines. It is possible that this site is not encased by the casing 300. The magnet 20 is inserted into the opening 120 as a separate object after the pole core 25. Since the hole 105 is sealed after the pole core 25 has been inserted, the lateral openings 140 (for example slits as are apparent in FIG. 1A) facilitate the procedure of inserting the magnet 20 since by way of pressure equalization the opening(s) 140 prevent air pockets.

Furthermore, FIG. 3 illustrates that the barrier 250 protects the connection region 210 having the slit 260 (cf. FIG. 2A) effectively against the encapsulating mass. The metal sleeve 400 is for example fastened to the casing 300 by caulking 410. An optional O-ring 450 is provided between the casing 300 and the protective sleeve 400 and said O-ring ensures a reliable seal between the inner region of the protection sleeve 400 and the outer region.

FIGS. 4A to 4C illustrate the radial inductive rotational speed sensor in accordance with an exemplary embodiment of the present invention, wherein said radial inductive rotational speed sensor is illustrated in FIG. 4A without the casing 300 and the sleeve 400 that are apparent in FIGS. 4B and 4C. In the case of the radial variant of the rotational speed sensor, only the end section of the contact region 220 is additionally bent in order to render it possible to contact the connection cable 30 in a radial direction.

For the illustrated radial rotational speed sensor, the contact regions 220 are bent in a perpendicular manner away from the axial axis R (cf. FIG. 4A) with the result that the electrical connection cables 30 face in the radial direction away from the axial axis R. For this purpose, the bendable sections 230 can be used (cf. FIG. 2B). The connection cables 30 are guided in this case in a U-shaped manner towards the contact regions 220 with the result that the contact surfaces lie on the contact regions 220 parallel to one another. However, as is apparent in FIG. 3 for the axial sensor, a Y-shaped contacting arrangement is also selected.

By virtue of providing two bending sections 230, 232 that are embodied perpendicular to one another, it is possible to arrange the contact regions 220 in any desired direction: from parallel to a V-shaped or U-shaped arrangement of the two contact regions 220. Consequently, a flexible electrical contact is possible and the connection cables 30 can be routed in almost any desired manner.

FIG. 4A illustrates the coil body together with the coil 10 and the inserted pole core 25 and magnet 20 that are retained by the latching hook 130 in the axial direction. FIG. 4B illustrates the result of providing the casing 300 and FIG. 4C illustrates the attached protective sleeve 400. These steps can be performed together in the identical manner.

In the exemplary encapsulation process that is used for this purpose, it is possible to use the anti-rotation devices 150 in order to fix the coil body shown in FIG. 4A in the tool that is used for this purpose.

The procedure of fixing the magnet 20 and the pole core 25 by a latching hook 130 provides the advantage that in the case of a manufacturing fault the magnet 20 or the pole core 25 can be removed in turn and thus the number of rejects during the manufacturing process is minimized. The pole core 25 can be for example a prefabricated component that does not need to be reworked.

FIG. 4B illustrates the radial inductive sensor prior to attaching the protective sleeve 400. The casing 300 is embodied in this case in such a manner that it forms a plurality of ribs 330 on the outer surface. The anti-rotation device 150 can be embodied for example as an arrow-shaped protrusion (in FIG. 4A the vertically upwards facing anti-rotation device 150) and after the casing has been provided can be part of the ribs 330. For this purpose, said anti-rotation device engages in a groove in the tool and thereby prevents a relative rotational movement. The ribs 330 end for example on a plateau 340. The plateau 340 can be used in order to connect the protective sleeve 400 by way of caulking 410 to the casing 300.

Further anti-rotation devices 150 can be embodied for example as pins (in FIG. 4A the anti-rotation device 150 that is protruding out of the drawing plane) that extend at least as far as a surface (or slightly out of the surface) of the casing 300. Optionally, it is likewise possible that at least one anti-rotation device is embodied in such a manner that the casing forms a groove 331, such as is illustrated in FIG. 4B.

FIG. 4C illustrates the radial inductive sensor in which the protection sleeve 400 is embodied in part around the casing 300. The protective sleeve 400 is, as already mentioned, joined to the casing 300 by at least one caulking site 410 by using the plateau 340. Furthermore, the ribs 330 are integrally formed in such a manner that they produce a sleeve clamping arrangement (in other words they firmly retain the sleeve 400 without any play).

In the case of conventional rotational speed sensors, rotational movement is prevented by way of an end section of the pole core that is clamped in the encapsulating tool and subsequently removed from said encapsulating tool. This work step is omitted in the case of exemplary embodiments of the present invention since it is ensured that the coil body is reliably fixed within the encapsulating tool by way of the anti-rotation devices 150 that moreover do not need to be reworked since they are part of the ribs 330 that is used to clamp the sleeve.

The features of the invention that are disclosed in the description, in the claims and in the figures can be essential both individually and also in any combination for the realization of the invention.

THE LIST OF REFERENCE NUMERALS IS AS FOLLOWS

10 Coil/coil windings
12 Wire of the coil
15 Connection region between the coil and the current rail
20 Magnet
25 Pole core
20+25 Pole assembly
30 Electrical connection cable(s)
100 Base body
105 Hole/opening in the end section
110 Winding region
115 Disk-shaped end section
120 Opening
130 Latching hook
140 Venting opening
150 Anti-rotation device
200 current rail(s)
210 Connection region(s)
220 Contact region(s)
230 Bendable section
240 Tab
250 Barrier
260 Slit
262 Stops
270 Intermediate region
300 Casing
330 Ribs
340 Plateau
400 Protective sleeve/metal sleeve
410 Caulking site
R Axial axis

The invention claimed is:

1. A coil body for an inductive rotational speed sensor, comprising:
a base body having at least one winding region for coil windings about an axial axis and an opening for receiving a pole assembly along the axial axis; and
two current rails, each current rail of the current rails runs parallel to the axial axis and includes a respective contact region for a respective electrical connection cable to connect at least one coil winding of the coil windings in the at least one winding region to the respective electrical connection cable, wherein each of the current rails is formed from a flat metal sheet and has a main surface, each current rail being bent, about a longitudinal direction, in the respective contact region to form a respective contact surface perpendicular to the main surface;
wherein each current rail of the two current rails includes a respective connection region and a respective intermediate region, the respective intermediate region being situated between the respective connection region and the respective contact region, the respective connection region being at a first end of the current rail and the respective contact region being at a second end of the current rail, the first and second ends being opposite ends of the current rail relative to each other;
wherein each of the respective contact regions includes a bendable section in the respective contact surface and is configured to guide the respective electrical connection cable, at least in some sections, (i) parallel to the axial axis for an axial variant or, (ii) perpendicular thereto in a radial manner for a radial variant,
wherein each bendable section of each of the respective contact regions has a reduced cross-sectional area by way of two material cut-outs, so that a defined bend of the bendable section can be realized in a manner in which an end section of the respective contact region can be bent about an axis that is perpendicular to the main surface, at the material cut-outs, away from the axial axis and perpendicular to a remaining part of the respective contact region;
wherein the two current rails are formed identically and fastened to opposite lying sides on the base body,
wherein each respective current rail of the two current rails includes a respective tab fixed to the base body and which by a positive-locking or a non-positive locking fixing arrangement on the base body, the respective tabs prevent displacement of the current rails relative to the base body, and wherein for each respective current rail of the two current rails, the respective tab is formed as a vertically upwards bent section of the respective intermediate section of the respective current rail, and
wherein each respective current rail of the two current rails is bent in the respective connection region of the respective current rail, toward the respective contact region of the respective current rail, in a U-shape, and a protruding limb of each of the U-shapes has a slit which receives at least one wire of the coil, the protruding limb extending in a direction toward the respective contact region of the respective current rail.

2. The coil body of claim 1, further comprising:
at least one anti-rotation device that is embodied as a radial protrusion on the base body by virtue of retaining the coil body in the encapsulation tool to prevent the coil body from rotating during an encapsulation process.

3. The coil body of claim 1, wherein the base body includes at least one latching hook that is embodied so as to fix a pole assembly that is inserted in the opening of the base body so as to prevent an axial movement of the inserted pole assembly.

4. The coil body of claim 1, wherein the base body includes at least one venting opening for connecting an inner region of the base body, which is accessible through the opening, to an outer region to equalize the pressure between the inner region of the base body and the outer region as the pole assembly is inserted.

5. The coil body of claim 1, wherein each of the two current rails includes a barrier that is embodied to divert, during an encapsulation procedure, an encapsulating mass in the encapsulation tool to protect an electrical contact to the coil.

6. The coil body of claim 1, wherein the contact regions of the two current rails each include a surface area for welding or soldering or crimping the respective electrical connection cable, or a further contacting arrangement to fasten the respective electrical connection cable to the respective contact region.

7. The coil body of claim 1, wherein each current rail of the current rails includes a respective notch to facilitate a bending of the current rail along the axial axis.

8. The coil body of claim 1, wherein the end section of the respective contact region of each respective current rail of the two current rails is bent about the axis that is perpendicular to the main surface of the respective contact rail, at the material cut-outs of the bendable section of the contact region of the respective current rail, away from the axial axis and perpendicular to the remaining part of the contact region of respective current rail.

9. An inductive rotational speed sensor, comprising:
a coil body for an inductive rotational speed sensor, including:
a pole assembly;
a base body having at least one winding region, which includes coil windings about an axial axis and an opening that receives along the axial axis the pole assembly, wherein the pole assembly includes a magnet and a pole core in the opening of the base body; and
two current rails, each of current rail of the current rails runs parallel to the axial axis and includes a respective contact region for a respective electrical connection cable to connect at least one coil winding of the coil windings in the at least one winding region to the respective electrical connection cable, wherein each of the current rails is formed from a flat metal sheet and has a main surface, each current rail being bent, about a longitudinal direction, in the respective contact region to form a respective contact surface perpendicular to the main surface;
wherein each current rail of the two current rails includes a respective connection region and a respective intermediate region, the respective intermediate region being situated between the respective connection region and the respective contact region, the respective connection region being at a first end of the current rail and the respective contact region being at a second end of the current rail, the first and second ends being opposite ends of the current rail relative to each other;
wherein each of the respective contact regions includes a bendable section in the respective contact surface and is configured to guide the respective electrical connection cable, at least in some sections, (i) parallel to the axial axis for an axial variant or, (ii) perpendicular thereto in a radial manner for a radial variant,
wherein each bendable section of each of the respective contact regions has a reduced cross-sectional area by way two material cut-outs so that a defined bend of the bendable section can be realized in a manner in which an end section of the respective contact region can be bent about an axis that is perpendicular to the main surface, at the material cut-outs, away from the axial axis and perpendicular to a remaining part of the respective contact region;
wherein the two current rails are formed identically and fastened to opposite lying sides on the base body;
a casing, which is made from a synthetic material, that encases at least in part the coil body, which has the coil windings and the pole assembly;
wherein each respective current rail of the two current rails includes a respective tab fixed to the base body and which by a positive-locking or a non-positive locking fixing arrangement on the base body, the respective tabs prevent an axial displacement of the current rails relative to the base body, and wherein for each respective current rail of the two current rails, the respective tab is formed as a vertically upwards bent section of the respective intermediate section of the respective current rail, and
wherein each respective current rail of the two current rails is bent in the respective connection region of the respective current rail, toward the respective contact region of the respective current rail, in a U-shape, and a protruding limb of each of the U-shapes has a slit which receives at least one wire of the coil, the protruding limb extending in a direction toward the respective contact region of the respective current rail.

10. The inductive rotational speed sensor of claim 9, wherein an anti-rotation device protrudes in part out of the casing or extends at least as far as an outer surface of the casing.

11. The inductive rotational speed sensor of claim 9, wherein the casing includes ribs having a plateau on which the ribs end, further comprising:
a protective sleeve that is embodied at least in part around the casing and is joined to the casing by using the plateau.

12. The inductive rotational speed sensor of claim 9, further comprising:
the electrical connection cables connected to the respective contact regions and running at least in part parallel to the axial axis to form an axial rotational speed sensor or run perpendicular thereto to form a radial rotational speed sensor.

13. The inductive rotational speed sensor of claim 9, wherein the end section of the respective contact region of each respective current rail of the two current rails is bent about the axis that is perpendicular to the main surface of the respective contact rail, at the material cut-outs of the bendable section of the contact region of the respective current rail, away from the axial axis and perpendicular to the remaining part of the contact region of respective current rail.

14. A method for producing two current rails for a coil body, the method comprising:
producing each current rail of the two current rails by:
stamping a flat metal sheet to form the current rail, the current rail having a main surface including a contact region, a connection region for at least one coil winding of a plurality of coil windings, and an intermediate region between the contact region and the connection region, the connection region being at a first end of the current rail and the contact region being at a second end of the current rail, the first and second ends being opposite ends of the current rail relative to one another,
wherein the contact region includes a bendable section and is configured to guide a respective electrical connection cable, at least in some sections, (i) parallel to an axial axis for an axial variant, or, (ii) perpendicular thereto, in a radial manner for a radial variant,
wherein the bendable section has a reduced cross-sectional area by way of two material cut-outs so that a defined bend of the bendable section can be realized in a manner in which an end section of the contact region can be bent about an axis perpendicular to the main surface, at the material cut-outs, away from the axial axis and perpendicular to a remaining part of the contact region;
forming a slit in the connection region for the at least one coil wire;
bending the connection region toward the contact region to form a U-shaped end section having the slit in a protruding limb, the protruding limb extending in a direction toward the contact region;

bending the contact region about a longitudinal direction to form a contact surface perpendicular to the main surface, wherein the bendable section is in the contact surface;

wherein the coil body includes:
- a base body having at least one winding region for the coil windings about the axial axis, and an opening for receiving a pole assembly along the axial axis; and
- the two current rails run parallel to the axial axis, and the contact regions electrically connecting the respective electrical connection cables to the coil windings in the winding region;

wherein each respective current rail of the two current rails includes a respective tab fixed to the base body and which by a positive-locking or a non-positive locking fixing arrangement on the base body, the respective tabs prevent an axial displacement of the current rails relative to the base body, and wherein for each respective current rail of the two current rails, the respective tab of the respective current rail is formed as a vertically upwards bent section of the intermediate section of the respective current rail.

15. The method of claim 14, further comprising bending the end sections of each contact region of each respective current rail of the two current rails about the axis that is perpendicular to the main surface of the respective current rail, at the material cut-outs of the bendable section of the contact region of the respective current rail, away from the axial axis and perpendicular to the remaining part of the contact region of respective current rail.

16. A method for producing a coil body for an inductive rotational speed sensor, the method comprising:
providing a base body that includes at least one winding region for coil windings about an axial axis and an opening for receiving a pole assembly along the axial axis; and
attaching two current rails that each run parallel to the axial axis and each include a respective contact region for a respective electrical connection cable to connect at least one coil winding of the coil windings in the at least one winding region to the respective electrical connection cable, wherein each of the current rails is formed from a flat metal sheet and has a main surface, each current rail being bent, about a longitudinal direction, in the respective contact region to form a respective contact surface perpendicular to the main surface;

wherein each current rail of the two current rails includes a respective connection region and a respective intermediate region, the respective intermediate region being situated between the respective connection region and the respective contact region, the respective connection region being at a first end of the current rail and the respective contact region being at a second end of the current rail, the first and second ends being opposite ends of the current rail relative to each other;

wherein for each of the two current rails, the respective contact region extends along the axial axis, and wherein each of the respective contact regions includes at least one bendable section in the respective contact surface and is configured to guide the respective electrical connection cable at least in some sections, (i) parallel to the axial axis for an axial variant, or (ii) perpendicular thereto in a radial manner for a radial variant, wherein each bendable section of each of the respective contact regions has a reduced cross-sectional area by way of two material cut-outs so that a defined bend of the bendable section can be realized in a manner in which an end section of the respective contact region can be bent about an axis that is perpendicular to the main surface, at the material cutouts, away from the axial axis and perpendicular to a remaining part of the respective contact region, and wherein each respective current rail of the two current rails includes a respective tab fixed to the base body and which by a positive-locking or a non-positive locking fixing arrangement on the base body, the respective tabs prevent an axial displacement of the current rails relative to the base body, and wherein for each respective current rail of the two current rails, the respective tab of the respective current rail is formed as a vertically upwards bent section of the respective intermediate section of the respective current rail, and wherein each respective current rail of the two current rails is bent in the respective connection region of the respective current rail, toward the respective contact region of the respective current rail, in a U-shape, and a protruding limb of each of the U-shapes has a slit which receives at least one wire of the coil, the protruding limb extending in a direction toward the respective contact region of the respective current rail.

17. The method of claim 16, wherein the end section of the respective contact region of each respective current rail of the two current rails is bent about the axis that is perpendicular to the main surface of the respective contact rail, at the material cut-outs of the bendable section of the contact region of the respective current rail, away from the axial axis and perpendicular to the remaining part of the contact region of respective current rail.

* * * * *